United States Patent
Sauron et al.

(10) Patent No.: US 6,407,370 B2
(45) Date of Patent: Jun. 18, 2002

(54) REGULATED ELECTRO-WELDING DEVICE

(75) Inventors: Jean Sauron, Draveil; Gil Gaunt, Saint Fargeau-Ponthiery, both of (FR)

(73) Assignee: Societe Joseph Sauron Materiel Industriel, Bondoufle (FR)

( * ) Notice: Subject to any disclaimer, the term of this patent is extended or adjusted under 35 U.S.C. 154(b) by 0 days.

(21) Appl. No.: 09/769,726

(22) Filed: Jan. 26, 2001

(30) Foreign Application Priority Data

Jan. 28, 2000 (FR) ............................................. 00 01117

(51) Int. Cl.$^7$ ............................................... B29C 65/34
(52) U.S. Cl. ....................... 219/535; 219/544; 219/492; 219/633; 156/304.2
(58) Field of Search .................................. 219/535, 544, 219/492, 633, 661; 156/304.2; 285/288.1

(56) References Cited

U.S. PATENT DOCUMENTS

| 4,918,292 A | | 4/1990 | Nussbaum et al. | |
| 5,130,518 A | * | 7/1992 | Merle | 219/497 |
| 5,138,136 A | | 8/1992 | Moreau et al. | |
| 5,466,916 A | * | 11/1995 | Iguchi et al. | 219/633 |
| 5,620,625 A | * | 4/1997 | Sauron et al. | 219/494 |
| 5,908,575 A | | 6/1999 | Smith et al. | |
| 6,036,795 A | * | 3/2000 | Sauron et al. | 156/304.2 |

FOREIGN PATENT DOCUMENTS

| FR | 2572326 | 10/1984 |
| FR | 2609933 | 7/1988 |
| WO | WO 98/53242 | 11/1998 |

* cited by examiner

*Primary Examiner*—John A. Jeffrey
(74) *Attorney, Agent, or Firm*—Rothwell, Figg, Ernst & Manbeck

(57) ABSTRACT

An electro-welding device for electrically welding plastic elements together, comprising: a power source for having an AC current in circulation, an electrical converter AC/DC, heating means electrically connected to the converter for heating the weldable elements, electrical regulating means interposed between the electrical converter and the heating means, the electrical regulating means comprising switching means having successive electrically passing and electrically non-passing phases, the electrical regulating means being subjected to the switch-over rhythm of said switching means for generating a switched over electrical signal.

4 Claims, 3 Drawing Sheets

FIG_1

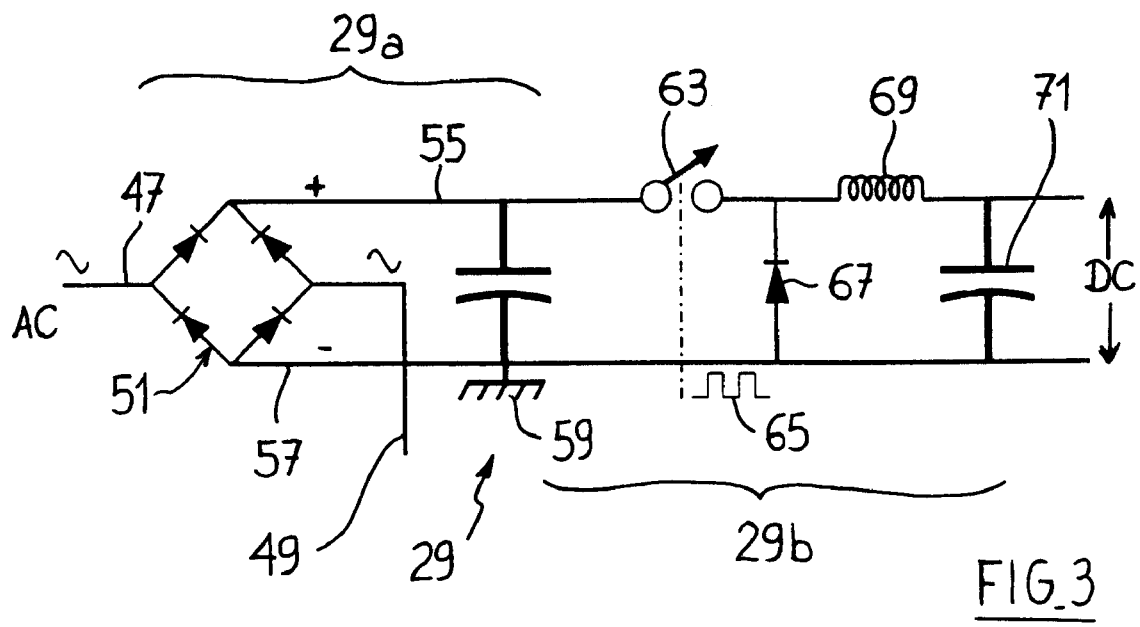
FIG_3
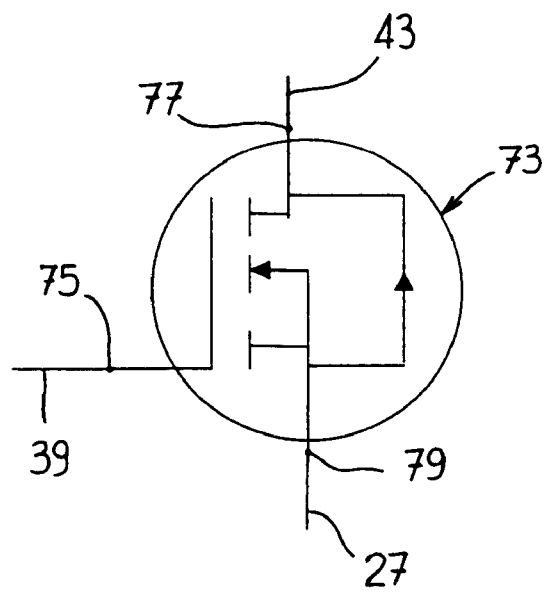
FIG_4

REGULATED ELECTRO-WELDING DEVICE

The invention relates to electro-welding, or electro-fusing, elements made of plastic material, especially thermoplastics, for welding those elements together.

BACKGROUND OF THE INVENTION

Apparatuses for electro-welding such elements are already known.

Typically, such apparatuses comprise:

a power source for generating an electrical signal, and for having an AC current in circulation, an electrical converter AC/DC, heating means, electrically connected to the converter for heating the weldable elements, at least locally, up to a temperature which is sufficient for fusing those elements and welding them, together.

Such an apparatus is notably disclosed in FR-A-2 572 326 or U.S. Pat. No. 5,138,136.

FR-A-2 572 326 relates to the automatic welding of plastic components including an integrated winding (coil). In order to carry out an automatic welding operation taking into account the diversity of the components used, an identification card, including the parameters useful for the production of the weld is associated with the components to be welded and means for reading the said card and for initiating the specified welding program, whilst taking into account the temperature of the components measured by a thermal probe, are provided on the welding machine. The invention is particularly applicable to the production of gas distribution networks by means of plastic pipes.

A system for making electrofusion joints between pipework components of thermoplastics materials containing resistance windings as inserts incorporates a device programmed to select the heating cycle appropriate to any particular combination of components, and compensate as necessary for variations in their initial temperature, in controlling the power supply and consolidation pressure cycles for effecting the joint. Each component is provided with a label or tag giving all necessary details about the component in a form suitable for automatic transcription into the programmed device, e.g. by optical or magnetic scanning.

However, the welding apparatuses of the prior art are not designed for being efficiently adapted to outdoor working conditions, especially in relation to the temperature.

Another problem is to be solved for adapting the welding apparatuses to the various elements to be welded, in relation to the compatibility between the apparatuses provided with one electrical resistance (such as an electrical resistance embedded within an electro-weldable connector made of plastic materials) and those apparatuses which are provided with heating means adapted for being heated by induction.

A further problem which is to be solved by the present invention relates to designing the welding apparatus so that it can operate as well as an <<inverter>> (supplied by a battery for having a direct, or unidirectional, DC current in circulation), or as an induction welding apparatus.

SUMMARY OF THE INVENTION

For improving the operating conditions of the existing apparatus and for solving at least a portion of the above-mentioned problems, an important feature of the invention consists in interposing electrical regulating means between the electrical converter and the heating means, those electrical regulating means being subjected to the commutating (or the switch-over) rhythm of switching means (also called <<switch>>) for generating a commutated electrical signal having a cyclic ratio ($\alpha$) which is variable, with $$\alpha = U_{RMS}^2 / U_{DC}^2$$

and $$\alpha = t_2/(t_1+t_2),$$

$U_{DC}$: input electrical voltage of the regulating means (voltage just upstream the regulation), $U_{RMS}$: variable output electrical voltage of the regulating means corresponding to the electrical current supplied to the heating means, $t_1$: time interval for each non-passing phase of the switch, $t_2$: time interval for each passing phase of the switch.

For enlarging the use of the welding apparatus of the invention and avoiding difficulties in electrically supplying said apparatus with electrical energy, another feature of the invention relates to interposing an electrical accumulator between the DC output of the converter and the regulating means.

Further, for improving the efficiency and reliability of the electro-welding (temperature, swiftness . . . ) during the fusing phase, another feature of the invention recommends that the variable output voltage of the regulating means is a stepped (or crenelled) voltage which is periodically null, during each non-passing phase ($t_1$) of the switch.

Furthermore, especially for allowing the welding apparatus of the invention to operate for heating by induction the elements to be welded, another feature of the invention recommends that the commutating rhythm ($\delta$ period) of the switching means is variable, so that the electrical signal frequency delivered to the heating means is also variable, together with the heating frequency.

BRIEF DESCRIPTION OF THE DRAWINGS

A more detailed description of the invention is following, with reference to the drawings in which:

FIG. 3 shows further details of a circuitry adapted to be used on the AC/DC conversion stage, FIG. 4 shows a FET (Field Effect Transistor) adapted to be used on a switching/regulating means, and FIG. 5 diagrammatically shows the evolution of the output voltage ($U_{RMS}$) for supplying the heating means, as a function of the time (t).

DETAILED DESCRIPTION OF THE DRAWINGS

In what follows, reference will only be made to the example of welding together two pipes, by means of a sleeve (also called <<coupling element>>). However, the invention can be used for welding various elements, such as for example, thermoplastic tubes by means of a saddle.

Figure 1:
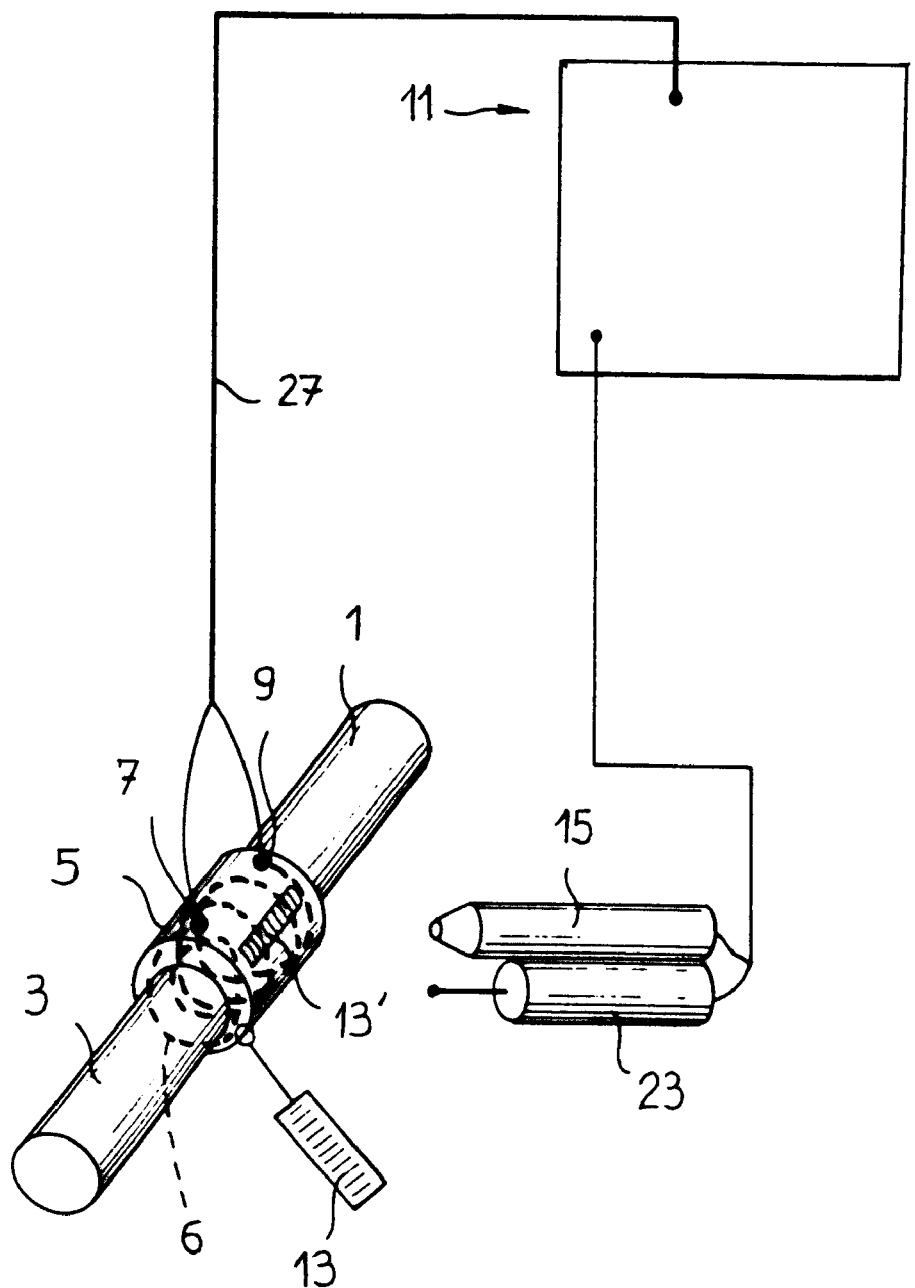
FIG. 1 diagrammatically shows an electro-welding apparatus having an electrical wire connection with the heating means of a connector, for welding together two plastic pipes.

On FIG. 1, two pipes 1, 3 made of a plastic material, for example polyethylene, are to be connected by means of a plastic sleeve 5 (for example made of polyethylene) adapted to be heat-welded round the terminal ends of pipes 1, 3 which are disposed end to end, coaxially.

The sleeve 5 comprises an electrical winding 6 embedded in the immediate vicinity of the internal wall of the sleeve.

The two ends of the electrical resistance can be connected, through two electrical supplying terminals 7, 9.

As already known, the heat-welding of sleeve 5 round pipes 1, 3 is operated by passing a determined electrical energy between the terminals 7, 9, during a predetermined time interval, for increasing the temperature of the above-referenced sleeve and pipes as high as required for welding them together.

Especially, said electrical energy and time interval are dependant from the diameter of the sleeve 5, the thickness of its wall, the electrical resistance of the winding, the length of the sleeve, the quality of the plastic material, etc.

Figure 2:
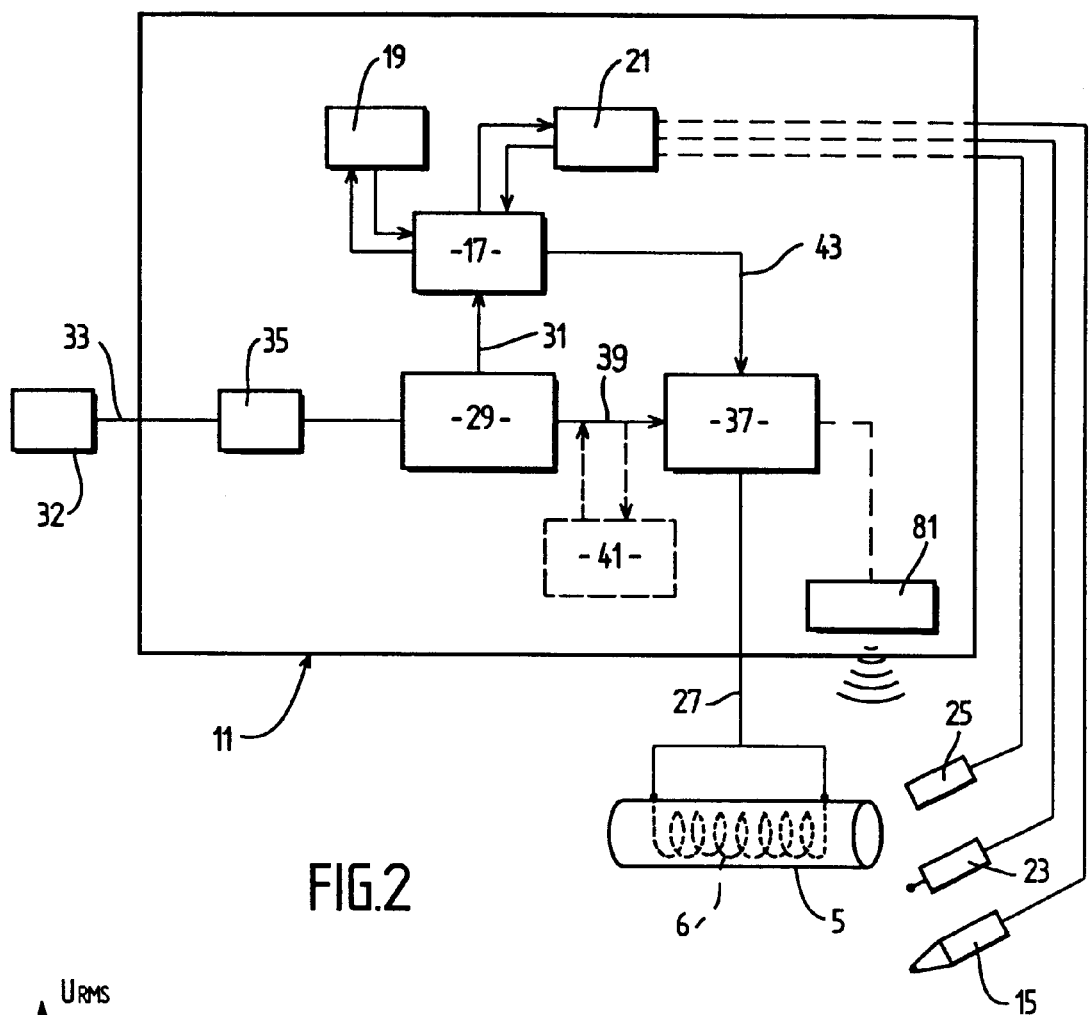
FIG. 2 shows internal details of the electro-welding machine.

Such parameters on which the welding software is based, within the apparatus 11 (viz. essentially the time interval and the electrical power source: energy, power, intensity and/or voltage to be delivered to the several electrical resistance) are indicated on an identification plate, such as 13 or 13' (see FIG. 2).

Those data can be incorporated in a bar-code card, (or a magnetic code, an electronic chip, etc.).

The selected bar-code card is fixed to the pipes or to the coupling element 5. Said bar-code card is adapted to be read, for example by means of an optical pencil 15 connected to the apparatus 11 for providing an electronic card 17 with the data as read.

Such an electronic card manages the interface with the operator, through a display unit 19 and a keyboard 21, along with the automated acquisitions of data by an electronic reader 15 (for example a visual scanner). The electronic card 17 is connected to memories and further manages the communicating outputs (parallel, series connections . . . ).

The electronic card 17 further stores and processes data addressed to the card by a heating probe, such as the probe illustrated in 23, which can provide the card with temperature measurements corresponding to the temperature of the elements to be welded and/or to the ambient temperature, which temperature typically has an influence on the welding conditions (variations of the <<quantity>> of electrical energy to be supplied and/or of the duration of the electrical supply, especially).

If an ohmic measurement of the coupling element 5 is required, as disclosed in U.S. Pat. No. 4,837,424, such a measurement data is stored and processed within the electronic card which further calculates and supplies the coupling element 5 with the corresponding voltage and/or electrical current and/or energy and/or power, along with the time interval and the welding frequency required for connecting the pipes 1, 3 together.

The apparatus 11 further comprises an AC/DC converter 29 which controls the electrical supplying of the electronic card 17, through the line 31.

The converter 29 is provided with an alternative primary supplying voltage (alternative current AC) 33, from the power source 32 (such as a battery on site, for example), through an on/ off switch 35 typically comprising apparatus protecting means 11.

According to the invention, the AC/DC converter 29 is further connected to a electronic switch circuit 37 (also called <<regulating means>>) to which the AC/DC converter delivers a direct electronic signal (also called <<rectified unidirectional signal>>) DC, such as especially an electronic voltage, through the line 39.

On the line 39, an accumulator or a battery, 41, can be connected in parallel for enabling the apparatus to operate in mode <<battery>>, so that the electrical energy is stored in the accumulator 41, said electrical energy (DC current) being thus ready to be supplied to the elements to be heated.

The switch circuit 37 is further controlled by the electronic card 17 which delivers to the circuit 37 the regulating instructions of the electrical 6 signal to be delivered to the sleeve 5. Those regulating instructions are previously calculated in the card 17, as a function of:

(a) the electrical signal delivered in the line 39 (which signal depends on the signal supplied through the line 31), (b) the measurements operated by the probe(s) (temperature readings, ohm readings . . . ), (c) an electrical internal calculation, as above-mentioned (voltage and/or current and/or energy and/or power) operated concomitant with the calculation of the heating time interval and the heating frequency to be applied for heating the resistance of the coupling element 5.

Thus, the switch circuit 37 is provided with the electrical input signal, through the line 39. Said electrical input signal is to be periodically inverted/regulated by the switch circuit 37, as a function of the switching/regulating instructions addressed through the cable line 33, 43, under the control of the electronic card 17.

The switched/regulated electrical signal is further delivered to the coupling element 5, through the connecting line 27. The AC/DC converter 29 can be manufactured as diagramatically illustrated on FIG. 3.

Its input portion comprises at first electrical rectifying means 29a, followed by electrical lower means 29b.

The input AC signal addressed in 47 and 49 passes through a diode rectifier (or diode bridge) 51. A capacitance 53 is connected in parallel to the output of the diode bridge 51, between the positive (+) and negative (−) pole lines respectively referenced 55 and 57. The earth (or ground) is referenced 59. At the output of the rectifier 29a, the rectified electrical signal is addressed to the electrical signal limiter 29b which comprises an on/off (passing/non passing) switch means 73, the output of which addresses a square electrical signal diagrammatically referenced in 65. A diode 67 is connected downstream the switch 63, between the pole lines 55 and 57. A self-inductance 69 defines the threshold for lowering the electrical signal, and a capacitance 71 is connected, at the output, between the pole lines 55 and 57, Thus, the output signal delivered at the output of the rectifier/voltage limiter 29 is a rectified electrical signal (DC) and said signal is addressed on the electrical line 39.

FIG. 4 shows a main component of the switching circuit 37, Said component, referenced 73 and also called <<switching means>> is a FET 73. The input 75 of the transistor receives the corresponding signal from the line 39. The second input 77 is connected to the line 43 (through which is addressed the switching/regulating instructions issued from the electronic card 17.

The output 79 of the FET delivers a changed-over signal to the line 27.

Let us consider $U_{DC}$ as the input voltage signal received by the transistor 73, before regulating said signal in the regulating/switch circuit 37, $U_{RMS}$ is the output voltage signal delivered by the circuit 37 to the heating means of the coupling element 5, and $t_1$ and $t_2$ as the time intervals of the respective non-passing (off) and passing (on) phase of the switch, viz. the on/off switching time intervals of the input signal.

With such an input signal (which is supposed to be the voltage signal $U_{DC}$) the circuit 37 generates an output signal $U_{RMS}$ between the resistance terminals, with a cyclic ratio α such as $\alpha = U^2_{RMS}/U^2_{DC}$ and $\alpha = t_2/(t_1+t_2)$, under the control of the commutating rhythm $(t_1, t_2)$ determined by the switching means 73 which is itself controlled by the electrical impulses addressed by the electronic card 17.

From the above, it is to be understood that the specifications for welding the above-mentioned elements, including the so-called <<first data>> at least partially contained within the code 13, 13', are read by the visual reader 15 and are thus acquired within the electronic card 17. Said card 17 also acquires second data transmitted by the measuring means (probes 23, 25 especially).

The above-mentioned first and second data have an influence on the cyclic ratio between the periodically changed-over output signal and the input signal of circuit 37. So, the output electrical signal (presently $U_{RMS}$) corresponds to a so-called <<shopped>> signal, viz. a signal having a value liable to vary.

Figure 5:
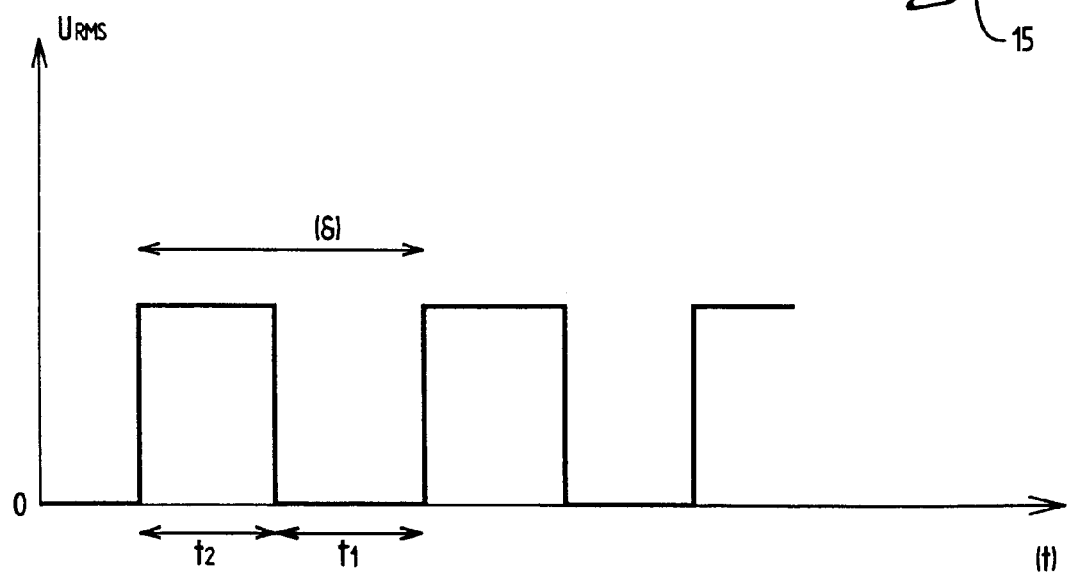

FIG. 5 diagrammatically shows the output signal $U_{RMS}$ (supposed to be an electrical voltage) delivered for a determined switched period a (said period being controlled by the electronic card 17).

The cyclic ratio a is the ratio between the time intervals $t_1$ and $t_2$ shown on FIG. 5, with a $\alpha = t_2/(t_1+t_2)$.

The switching rhythm (viz., the time intervals of the successive passing and non-passing periods of the switch 37) and the value of the input signal determine the frequency and the amplitude of the output signal.

As shown on FIG. 5, a steady crenelled signal can be obtained if the switching period (rhythm) is constant. Said crenelled signal is periodically null (non-passing phases of the switch), whereas said output signal (presently the output voltage signal) $U_{RMS}$ is periodically maximum during all the time interval of each passing phase of the switch 37.

Nowadays, a range of voltages comprised between 8 Volts and 44 Volts is typically selected for the most well-known electro-welding machines. The value of said voltage is especially a function of the working conditions, and so is a function of the measures delivered by any probe, or is a function of input data entered by the operator, through the keyboard.

According to the invention, such an electro-welding apparatus is adapted to operate either at a constant frequency in a <<direct>> supplying mode, without any battery 41 (welding apparatus comprising an <<inverter>>), or in an <<indirect>> supplying mode, through the battery 41.

In a so-called <<battery welding apparatus>> the electrical energy is stored in an electrical accumulator. A <<direct>> voltage (corresponding to a unidirectional DC current) of $U_{DC}$=48 V is typically applied. If the output voltage ($U_{RMS}$) is to be set at 24 V, then the cyclic ratio a is 0.25, whereas said ratio is 0.677 for an output voltage of 39.5 V. The steady frequency (rhythm) f is typically of about 100 Hz.

On a machine of the <<inverter>> type, the electrical energy is not stored in an accumulator. The input voltage in the switch/regulating circuit 37 ($U_{DC}$) is typically of about 200 to 250 V (for example 230 V). If the output voltage ($U_{RMS}$) is to be set at 24 V, then the cyclic ratio is α=0.0108, whereas α=0.0455 for $U_{RMS}$=39,5 V.

For such a type of machine, the frequency is of about 15 to 25 kHz (for example 20 kHz), because the electronic components for the regulation are operated at such a high frequency. Thus, the dimensions and the heating conditions of the electrical transformer (non illustrated) are reduced, and the transformer can often be integrated in the switch/regulating circuit 37.

However, the electro-welding machine of the invention is also adapted for heating a coupling element 5 by induction, at a variable switching frequency.

Those variations in the frequency of the changed-over signal delivered at the output of the regulating/switch circuit 37 depend on the switching rhythm of the FET 73. If required, the cyclic ratio is also ready to have a variable value, as above-mentioned (time interval of the passing/non passing phases of the transistor . . . ).

So, for typical operating frequencies of the DC signal comprised between about a hundred of kHz and some tens of MHZ, a wireless heating is obtained, induced by the resonance of the heating element, through a magnetic field. The variation of the magnetic induction flux passing through the heating element produces the fusing of the coupling element 5 together with the pipes to be welded. The heating element can be a grid or a hollow cylindrical cage made of a metallic alloy adapted to the frequency (or the frequency range) of the induced vibrations.

For such machines of the <<induction>> type, the electrical energy is not necessarily stored in an electric accumulator. Typically, the DC input voltage is elevated for reducing the electrical current and the corresponding induction frequency. If an electrical current is to be regulated/switched-over, as a function of the $U_{RMS}$ voltage and the electrical charge), the cyclic ratio can be calculated as above-mentioned.

It is to be noted that in a so-called <<induction>> electro-welding machine, the operating frequency is high, in a range between a hundred of kHz and several tens (or hundreds) of MHZ. The frequency depends on the selected vibratory heating element.

On such a machine, the cable line 27 is no more useful. In place of said line 27, is an emitter 81 which emits the required magnetic field towards the corresponding receptive heating element, at the required frequency (see FIG. 2).

What is claimed is:

1. An electro-welding device for electrically welding plastic elements together, the device comprising:

a power source for generating an electrical signal, and for having an AC current in circulation, an electrical converter which converts AC to DC, heating means, electrically connected to the converter for heating the weldable elements, at least locally, up to a temperature which is sufficient for fusing those elements and welding them together, electrical regulating means interposed between the electrical converter and the heating means, the electrical regulating means comprising switching means having successive electrically passing and electrically non-passing phases, the electrical regulating means being subjected to the switch-over rhythm of said switching means for generating a switched over electrical signal having a cyclic ratio (α) which is variable, with $$\alpha = U^2_{RMS}/U^2_{DC}$$

and $$\alpha = t_2/(t_1+t_2),$$

$U_{DC}$: input electrical voltage of the regulating means,
$U_{RMS}$: variable output electrical voltage of the regulating means corresponding to the electrical current supplied to the heating means,
$t_1$: time interval for each non-passing phase of the switching means,
$t_2$: time interval for each passing phase of the switching means.

2. The device of claim 1, wherein the variable output electrical voltage of the regulating means is a stepped voltage which is periodically null, during each non-passing phase ($t_1$) of the switching means.

3. The device of claim 1, wherein an electrical accumulator is interposed between the converter and the regulating means.

4. The device of claim 1, wherein the switching-over rhythm of the switching means is variable for delivering a switching-over signal having a variable frequency towards the heating means and thus, for inducing a heating of said plastic elements by induction.

* * * * *